United States Patent
Holmelin et al.

(10) Patent No.: US 10,200,352 B2
(45) Date of Patent: Feb. 5, 2019

(54) SYSTEM AND METHOD FOR SECURE APPLICATION COMMUNICATION BETWEEN NETWORKED PROCESSORS

(71) Applicant: NETOP SOLUTIONS A/S, Birkerod (DK)

(72) Inventors: Peter Holmelin, Copenhagen (DK); Valentin Palade, Pancota (RO); Dragos Ivan, Sulina (RO)

(73) Assignee: NETOP SOLUTIONS A/S, Birkerod (DK)

( * ) Notice: Subject to any disclaimer, the term of this patent is extended or adjusted under 35 U.S.C. 154(b) by 0 days.

(21) Appl. No.: 14/213,893

(22) Filed: Mar. 14, 2014

(65) Prior Publication Data

US 2014/0282914 A1 Sep. 18, 2014

Related U.S. Application Data

(60) Provisional application No. 61/798,491, filed on Mar. 15, 2013.

(51) Int. Cl.
*G06F 7/04* (2006.01)
*G06F 15/16* (2006.01)
(Continued)

(52) U.S. Cl.
CPC .......... *H04L 63/08* (2013.01); *H04L 63/0272* (2013.01); *H04L 63/0227* (2013.01); *H04L 63/0876* (2013.01); *H04L 63/101* (2013.01)

(58) Field of Classification Search
CPC ........................... H04L 63/08; H04L 63/0272
See application file for complete search history.

(56) References Cited

U.S. PATENT DOCUMENTS 7,380,123 B1   5/2008 Hernacki et al.
8,738,902 B2 *  5/2014 Yoo ..................... H04L 63/0823
                                                     713/151

(Continued)

FOREIGN PATENT DOCUMENTS

WO   2005022838 A1   3/2005
WO   2006012612 A1   2/2006
WO   2012128423 A1   9/2012

OTHER PUBLICATIONS

International Search Report and Written Opinion for PCT Application No. PCT/US2014/029371 dated Aug. 14, 2014.

(Continued)

*Primary Examiner* — Mahfuzur Rahman
*Assistant Examiner* — Darshan I Dhruv
(74) *Attorney, Agent, or Firm* — Neal, Gerber & Eisenberg LLP; James P. Muraff

(57) ABSTRACT

A system and method is disclosed for transporting application data through a communications tunnel between a host device and a guest device that each includes networked processors. The application data may be transported between the host device and the guest device through an allowed port of the host device, the communications tunnel, and a port of the guest device. Based on logon credentials, the guest device can be authenticated by a security server and a role may be determined. The role can include allowed ports and associated applications on the host that the guest is allowed to access. Remote access from the guest device to host devices or remote devices may be enabled without needing prior knowledge of their configurations. Secure access may be facilitated to remote host devices or remote devices, according to security policies that can vary on a per-session basis and takes into account various factors.

26 Claims, 10 Drawing Sheets

(51) Int. Cl.
*G06F 17/30* (2006.01)
*H04L 29/06* (2006.01)

(56) References Cited

U.S. PATENT DOCUMENTS

| | | | |
|---|---|---|---|
| 2001/0009025 A1* | 7/2001 | Ahonen | H04L 12/4641 713/161 |
| 2004/0168088 A1* | 8/2004 | Guo | H04L 12/2859 726/15 |
| 2005/0060328 A1* | 3/2005 | Suhonen | H04L 63/0263 |
| 2005/0086346 A1 | 4/2005 | Meyer | |
| 2006/0004918 A1* | 1/2006 | Lubeck | H04L 41/0853 709/223 |
| 2006/0041761 A1* | 2/2006 | Neumann | G06F 21/32 713/189 |
| 2006/0190998 A1* | 8/2006 | Aiello | H04L 43/16 726/11 |
| 2007/0050850 A1* | 3/2007 | Katoh | G06F 21/31 726/27 |
| 2007/0150946 A1* | 6/2007 | Hanberger | H04L 63/0272 726/15 |
| 2007/0226350 A1 | 9/2007 | Sanda et al. | |
| 2008/0037557 A1* | 2/2008 | Fujita | H04L 12/4633 370/395.53 |
| 2009/0092247 A1* | 4/2009 | Kido | H04L 63/062 380/30 |
| 2010/0094978 A1* | 4/2010 | Runeson | H04L 29/12367 709/221 |
| 2010/0095367 A1* | 4/2010 | Narayanaswamy | H04L 63/0245 726/12 |
| 2010/0325719 A1* | 12/2010 | Etchegoyen | H04L 63/0272 726/15 |
| 2011/0173522 A1* | 7/2011 | Gupta | G06Q 10/107 715/205 |
| 2011/0214176 A1* | 9/2011 | Burch | G06F 9/455 726/15 |
| 2011/0277019 A1 | 11/2011 | Pritchard, Jr. | |
| 2011/0289235 A1* | 11/2011 | Takashima | H04L 67/1002 709/241 |
| 2012/0203915 A1* | 8/2012 | Moeller | H04W 76/10 709/227 |
| 2012/0278492 A1* | 11/2012 | Jiang | H04L 63/02 709/227 |
| 2013/0074048 A1* | 3/2013 | Osawa | G06F 8/30 717/127 |
| 2013/0340063 A1* | 12/2013 | Larsson | G06F 21/335 726/9 |
| 2014/0123222 A1* | 5/2014 | Omar | H04L 63/102 726/3 |
| 2014/0282976 A1 | 9/2014 | Holmelin et al. | |

OTHER PUBLICATIONS

European Search Report for European Application No. 14765651.6 dated Jul. 22, 2016, 9 pages.
PIX/ASA: Allow Remote Desktop Protocol Connection through the Security Appliance Configuration Example—Cisco, Feb. 24, 2011, 12 pages.
Radius, Wikipedia, the free enclyclopedia, Jan. 4, 2013, 13 pages, retrieved from https://en.wikipedia.org/w/index.php?title=RADIUS&oldid=531238327 on Jul. 14, 2016.

* cited by examiner

SYSTEM AND METHOD FOR SECURE APPLICATION COMMUNICATION BETWEEN NETWORKED PROCESSORS

CROSS-REFERENCE TO RELATED APPLICATION

This application claims priority to U.S. Application No. 61/798,491, filed Mar. 15, 2013 which is incorporated herein by reference in its entirety.

TECHNICAL FIELD

This invention relates to a system and method for secure application communication between networked processors, including processor-based devices with networking capability. More particularly, this invention provides a system and method for transporting application data through a communications tunnel between a host device and a guest device, and the application data may be forwarded between the host device and the guest device through an allowed port of the host device, the communications tunnel, and a port of the guest device during an active session.

BACKGROUND

Remote access systems that enable access to a remote device from a guest device have become more commonplace in recent years. For example, such systems can be utilized by employees to remotely access data and applications on corporate networks and by technical support personnel to assist customers in troubleshooting technical problems on their computers. Existing remote access systems typically enable access to a remote device from a guest device through a publically accessible gateway, virtual private network, and/or via a centralized publically accessible routing point. To remotely execute applications, the guest device can receive application data through static port forwarding techniques from the remote device, or by utilizing a remotely-generated graphical user interface that is displayed on the guest device, e.g., a traditional remote desktop transfer.

However, existing remote access systems do not typically provide secure enough access to remote devices, in view of security policies and/or standards which are not robust enough. The access provided by existing remote access systems may be on a per-session basis but not fully take into account various factors, such as date, time, user, the type of remote connection, the connection origin, and other factors. For example, guest devices that access remote devices with existing remote access systems have the same rights and privileges, regardless of the user, type of remote connection, time, date, and/or application to be executed. In addition, static port forwarding of application data may be suboptimal because it requires prior knowledge of the existence of an endpoint and its configuration. Static port forwarding also requires static open ports in a firewall for communication, which may be a security risk. Furthermore, existing remote access systems may require installing remote access software on each endpoint that needs to have remote access. Installing such remote access software on certain types of devices, such as building control systems, may not be technically possible due to incompatibility issues or may result in unacceptable security risks. An additional drawback to existing remote access systems includes that the guest device and/or the remote device may need to have publically-accessible open ports in order to be reached from outside their respective networks.

Therefore, there exists an opportunity for a system and method that addresses these concerns.

SUMMARY

The invention may transport data through a communications tunnel between a host device and a guest device over a network. The data transported between the host device and the guest device is forwarded through a port of the host device, the communications tunnel, and a port of the guest device. A session and the communications tunnel can be established or discovered using a connection facilitation server and/or established directly, in response to receiving a connection request and a host device identification. Based on logon credentials and the host device identification, the guest device can be authenticated by a security server. Authentication of the guest device may be through multi-factor authentication or through the security server, for example.

A role of an authenticated guest device can be determined by the security server that includes allowed host ports and associated applications that the guest device is allowed to access. The role may be determined based on the logon credentials, the date, the time, the connection type, an identification of the guest device, and/or other information. A user on the guest device can select one of the host ports and its associated application that the user would like to access. Data can be forwarded between the application executing on the host device and the guest device through the host port, the communications tunnel, and a port of the guest device, while the session is active. The port of the guest device may be dynamically selected by the guest device to avoid port conflicts. Events and corresponding timestamps may be logged to provide a full audit trail for compliance and legal purposes. In some embodiments, the data may be transported between a remote device and a guest device, and the communications tunnel may be through a host device and a connection facilitation server. The host device may be in communication with the remote device. Application data from the remote device may be forwarded through a selected remote port and the communications tunnel to a port of the guest device, while the session is active.

Through use of the invention, remote access from guest devices to host devices or remote devices may be enabled without needing prior knowledge of their configurations. Moreover, secure access may be facilitated to host devices or remote devices, according to security policies that can vary on a per-session basis and takes into account various factors. Only selected allowed ports may be utilized for remote access while other ports are restricted from being used. Other features and advantages are provided by the following description and drawings. Embodiments of the present invention include the option to enable another computing device to initiate and utilize connections previously described in the guest device. Trusted computing devices can thus dynamically and securely establish sessions for their specific business functions, such as scheduled retrieval of data, periodically check for alerts, etc without the need for human interaction. Trusted "Local Devices" (such as read servers/computers/systems) may connect to "Guest Devices" to support such functions.

DETAILED DESCRIPTION

Figure 1:
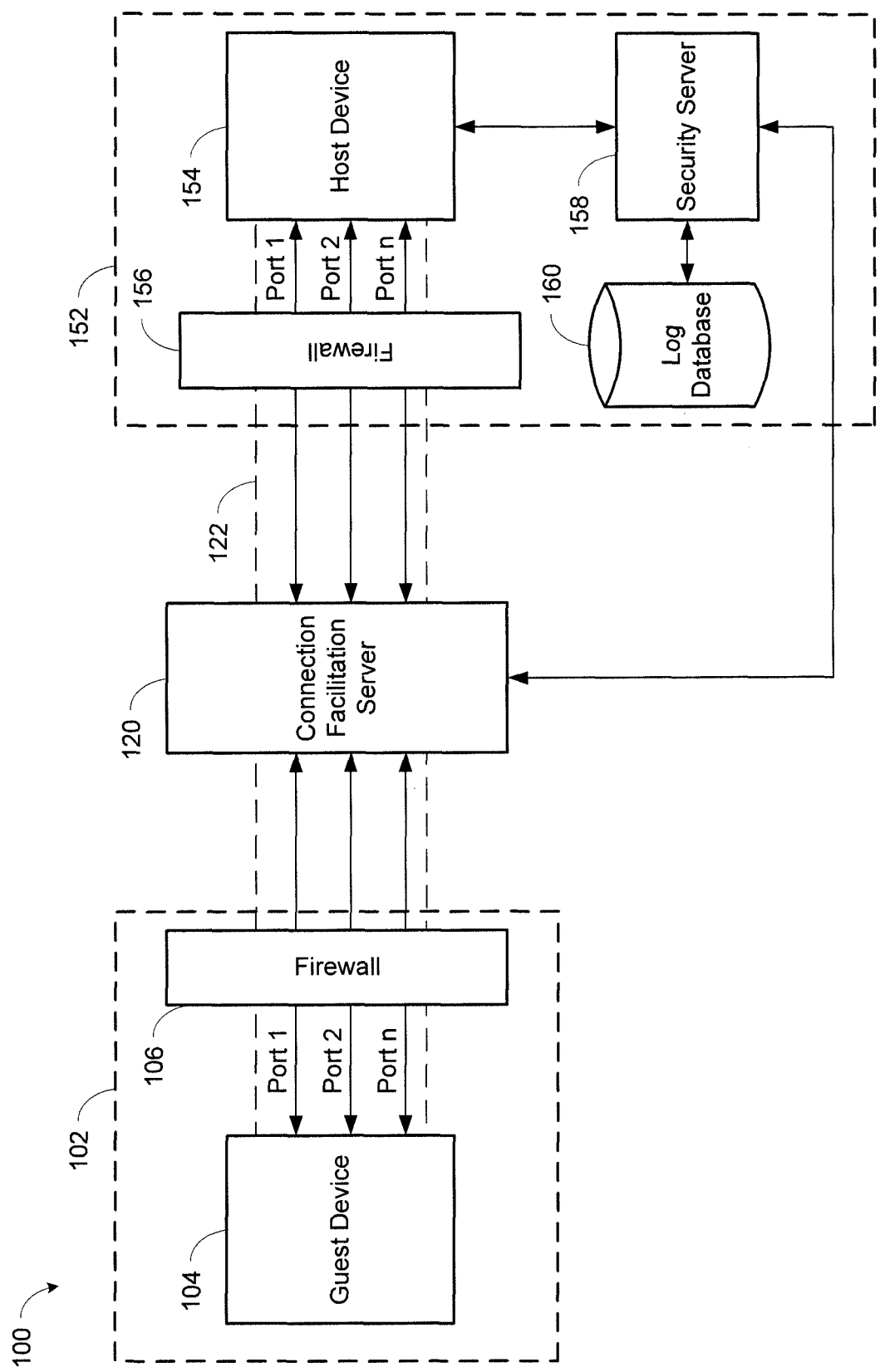
FIG. 1 is a block diagram illustrating an exemplary remote access system for transporting data through a communications tunnel between a guest device and a host device.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

FIG. 1 illustrates a remote access system 100 for transporting data through a communications tunnel 122 between a guest device 104 and a host device 154 over a network, such as the Internet. The remote access system 100 provides remote access from the guest device 104 to the host device 154 without needing prior knowledge of the configuration of the host device 154. Secure access to the host device 154 may be enabled according to security policies that can vary on a per-session basis and takes into account various factors. The role of the guest device 104, including the host ports and associated applications that the guest device 104 is allowed to access, may be determined by a security server 158 so that applicable security policies are enforced. Application data may be forwarded between the host device 154 and the guest device 104 through a communications tunnel 122. The communications tunnel 122 may be through a connection facilitation server 120. In particular, the application data may be forwarded between the host device 154 and the guest device 104 through a host port on the host device 154, the communications tunnel 122, and a port of the guest device 104. It should be noted that although FIG. 1 shows a single host device 154 for simplicity, it is contemplated that a particular guest device 104 can potentially connect to any number of host devices 154. Likewise, it is contemplated that a single host device 154 may potentially connect with any number of guest devices 104.

The guest device 104 may be located at a first location 102 and the host device 154 may be located at another location 152 remote from the first location. For example, the guest device 104 may be located at a branch office of a company and the host device 154 may be located at the central office of the company. The guest device 104 and the host device 154 may generally include any processor-based system that has networking capability. A firewall 106 may control traffic between the guest device 104 and devices external to the location 102, and similarly, a firewall 156 may control traffic between the host device 154 and devices external to the location 152. The firewalls 106 and 156 may be software-based or hardware-based, as is known in the art. The firewalls 106 and 156 do not need to have any inbound ports open, which can remove vulnerabilities to network breaches.

The connection facilitation server 120 may be external to both the guest device 104 at the location 102 and the host device 154 at the location 152. The connection facilitation server 120 may serve as a routing point for both the guest device 104 and the host device 154. In particular, the guest device 104 and the host device 154 may each make outbound connections to the connection facilitation server 120, which can then create the communications tunnel 122 to connect the guest device 104 and the host device 154, as described below. The guest device 104 and the host device 154 may each communicate connection requests, keep alive signals, and/or other data and information to the connection facilitation server 120. In some embodiments, the connection facilitation server 120 may include one or more connection servers and/or one or more connection managers to assist in creating the communications tunnel 122.

Figure 8:
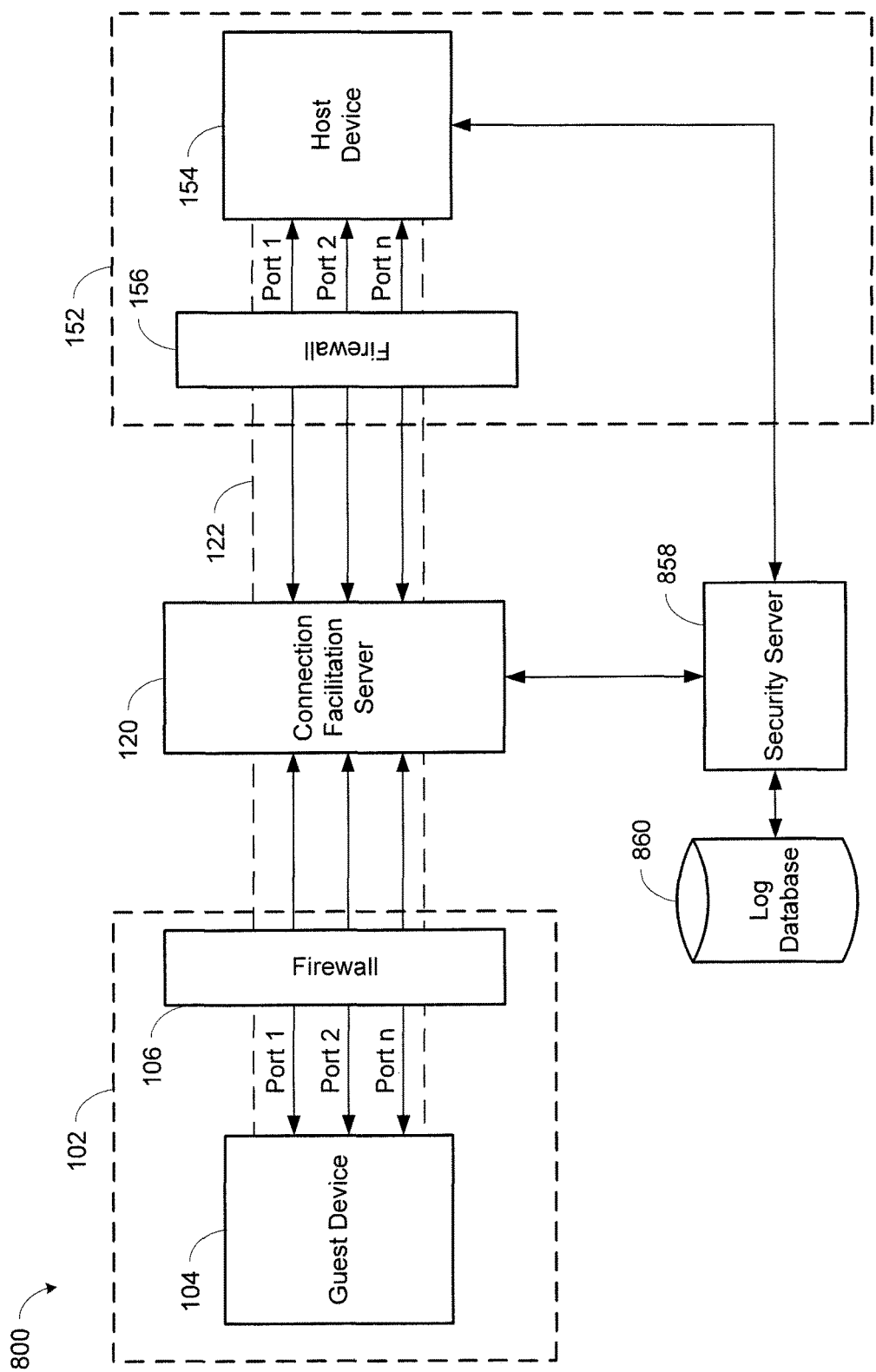
FIG. 8 is a block diagram illustrating an exemplary remote access system of FIG. 1 in which a security server is external to the location of the host device.

A security server 158 may be in communication with the host device 154 at the location 152. The security server 158 may also be in communication with the connection facilitation server 120. In some embodiments, the security server may be external to the location 152 and the location 102 but also be in communication with the host device 154, such as shown by the security server 858 in FIG. 8. The security server 858 in FIG. 8 may be utilized by the host device 154 and/or other devices (not shown) in the same way as described herein with respect to the security server 158.

The security server 158 may be utilized to implement security policies and standards. The security policies and standards may be set by an organization, such as a corporation, to define levels of access to computing resources of the organization. The levels of access may vary on a per-session basis, such as based on the user, the type of remote connection, date, time, the connection origin, and/or other factors. For example, the security policies may define that particular higher-level employees may have access to sensitive data and resources, such as confidential data, while lower-level employees may have access to less sensitive data and resources. As another example, employees may have greater access to computing resources if connecting to the host device 154 from a desktop computer at the home of the employee, and may have more restricted access to computing resources if connecting to the host device 154 from a laptop computer on a public wireless network.

The security server 158 may store and log events and corresponding timestamps when the events occurred to a log database 160. The events may have occurred during a session between the guest device 104 and the host device 154 over the communications tunnel 122. For example, the events may include that a session was established, that the guest device 104 was authenticated successfully, that data is being forwarded from the host device 154 through an allowed host port, and/or that a session was ended. Other events that may be logged include whether the communications tunnel access was confirmed or denied (e.g., if the user on the host device 154 specifically approved or denied access to the guest device 104), whether the communications tunnel 122 was created successfully or not, whether the communications tunnel 122 was connected or disconnected, and/or whether the connection was lost between the guest device 104 and the host device 154. The log database 160 may include logs of each established session that provide a full audit trail for compliance and legal purposes. The logging of events may be performed at different levels, such as basic packet logging (which is application independent) or application specific logging (which may include recording screen activity, audio transmission, etc.).

Each of the guest device 104 and the host device 154 may perform an initial handshake with the connection facilitation server 120, including connecting and authenticating to the connection facilitation server 120. The host device 154 may transmit to connection facilitation server 120 an identification of the host device 154. The guest device 104 may request a list of host devices 154 from the connection facilitation server 120 that are accessible to the guest computer 104. If the guest device 104 is authenticated and validated to the connection facilitation server 120, the guest device 104 may receive a host list among which might be also the host device 154. From the list of host devices 154, a user at the guest device 104 may select a particular host device 154 that the user wishes to access.

Figure 4:
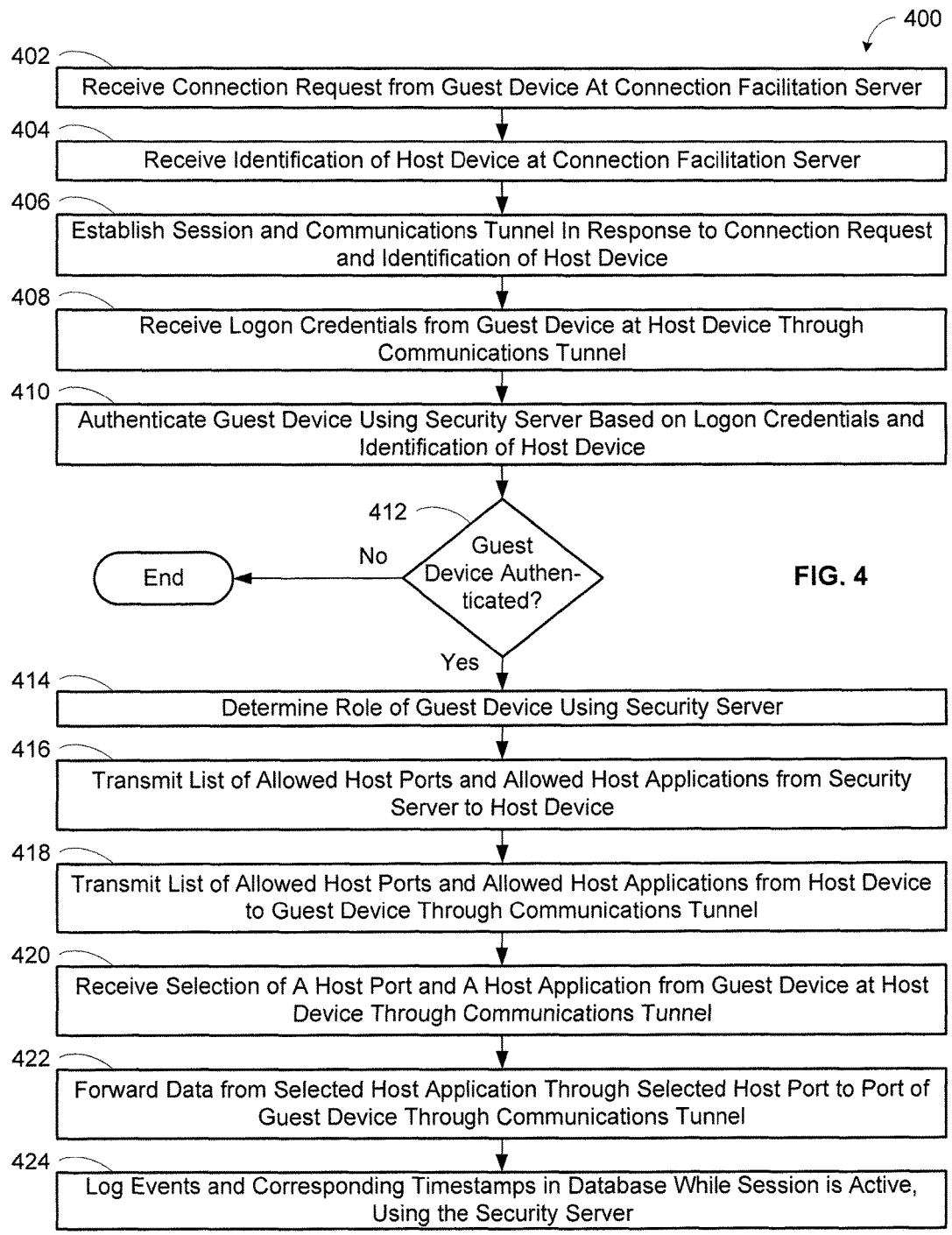
FIG. 4 is a flowchart illustrating operations for transporting data through a communications tunnel between a guest device and host device.
Figure 10:
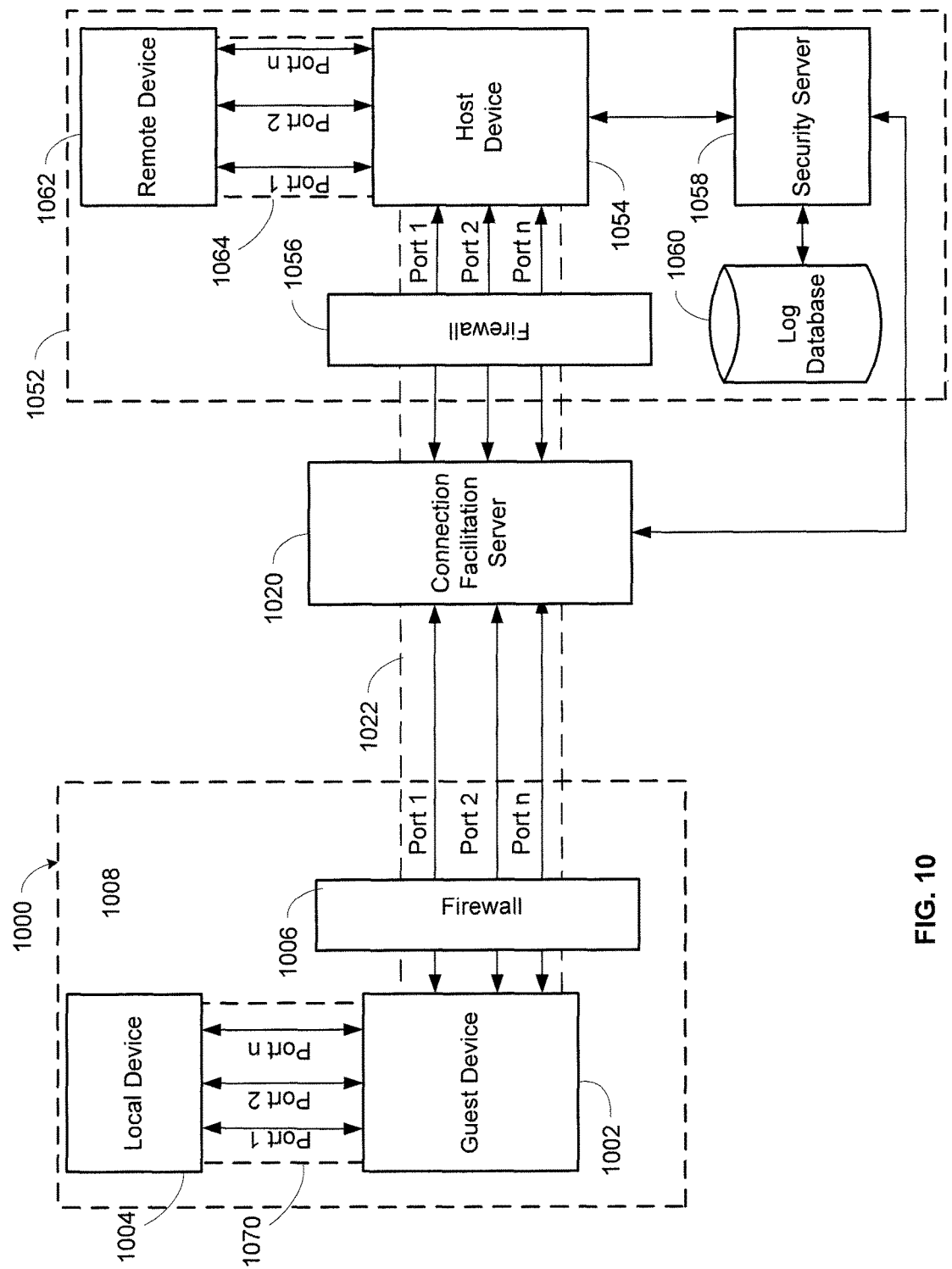
FIG. 10 is a block diagram illustrating an exemplary remote access system of FIG. 2 in which the communications tunnel established between the guest device and the host device may extend to a local device associated with the guest device.

Referring to FIG. 4 and other figures, an embodiment of a process 400 is shown for transporting data through a communications tunnel 122 between a guest device 104 (and further between the guest device 1002 and a local device 1004, as shown in FIG. 10) and a host device 154 over a network, using the system 100 of FIG. 1. At step 402, a connection request may be received from the guest device 104/local device 1004 at the connection facilitation server 120 that denotes that the guest device 104/local device 1004 desires to establish the communications tunnel 122 with the host device 154. The connection request may include an identification of the desired host device 154, for example. The connection facilitation server 120 may also receive an identification of the host device 154 at step 404 from the host device 154 to indicate that the host device 154 is available for connection, such as during the initial handshake described above. The identification of the host device 154 may be a unique identifier of the host device 154, and may include an arbitrary name, such as a static name, a DNS name of the host device 154, or a combination of environment variables (e.g., MAC address, IP address, username, etc.).

The communications tunnel 122 and a session may be established at step 406, in response to receiving the connection request and the identification of the host device 154. In particular, if the identification of the desired host device 154 in the connection request matches the identification of a host device 154 that is available for connection, then the communications tunnel 122 and the session may be established. The communications tunnel 122 may be established such that data can be securely exchanged between the guest device 104/local device 1004 and the host device 154, such as authentication data, application data, and/or other data. When application data is exchanged, as described further below, the application data may be forwarded between the host device 154 and the guest device 104/local device 1004 through a host port on the host device 154, the communications tunnel 122, and a port of the guest device 104/local device 1004. In the embodiment shown in FIG. 10, further when application data is exchanged, as described further below, the application data may be forwarded between the guest device 104, 204, 1002 and the local device 1004 through a port on the guest device 104, 204, 1002, a network 1070, and a port on the local device 1004.

At step 408, logon credentials may be received from the guest device 104/local device 1004 at the host device 154 through the communications tunnel 122. The logon credentials may correspond to a user of the guest device 104 and include a username, password, security certificate information, key cryptography information, smartcard information, and/or other credentials. Authentication of the guest device 104/local device 1004 may be performed at step 410 using the security server 158 based on the logon credentials and the identification of the host device 154. The host device 154 may have passed the logon credentials to, the security server 158, for example. The security server 158 may authenticate the logon credentials depending on the authentication type appropriate for the logon credentials and the user, and/or may receive confirmation of the authentication from other entities, such as an authentication authority. For example, the authentication type may be based on protocols such as Active Directory, LDAP (Lightweight Directory Access Protocol), RADIUS (Remote Authentication Dial In User Service), RSA, and/or other protocols. Embodiments of steps 408 and 410 with regards to receiving logon credentials and authenticating the guest device 104/local device 1004 are described below with respect to FIGS. 6 and 7.

It may be determined at step 412 whether the guest device 104/local device 1004 has been authenticated by the security server 158. If the guest device 104/local device 1004 has not been successfully authenticated at step 412, then the process 400 may be complete and the session may be ended. However, if the guest device 104/local device 1004 is successfully authenticated at step 412, then the process 400 may continue to step 414. At step 414, the role of the guest device 104/local device 1004 may be determined by the security server 158, based on the logon credentials, a date, a time, an identification of the guest device 104/local device 1004, an identification of the host device 154, a connection type between the guest device 104/local device 1004 and the connection facilitation server 120, the authentication type, and/or other factors. The security server 158 may determine the role of the guest device 104/local device 1004 based on security policies and standards set within the security server 158. The logon credentials may indicate an identity of the user of the guest device 104/local device 1004 and therefore the level of access, e.g., ports and applications, the user should have on the host device 154. The connection type between the guest device 104/local device 1004 and the connection facilitation server 120 may include whether the guest device 104/local device 1004 is connecting through a public unsecured network or a secured network, for example.

The defined role(s) of the guest device 104/local device 1004 may include the ports on the host device 154 that the guest device 104/local device 1004 is/are allowed to access, and the associated applications that utilize those ports on the host device 154. In one embodiment, similar to the remote device 262 relationship with the host device 154, 254 in FIGS. 2 and 10, the local device 1004 may not be compatible with the requisite software to enable access to the host device 254, 1054, for example, but can be in communication with the guest device 104, 1002 (which could have the necessary software for such communication, as described herein) to enable access from the local device 1004 to the host device 254, 1054, and vice versa. In an alternative embodiment, the local device 1004 may have the necessary software for such access, in which case the guest device 104, 204, 1002 may not require such software for communication to take place. Other embodiments are possible as well.

The role of the guest device 104/local device 1004 may include the ports on the host device 154 that the guest device 104/local device 1004 is allowed to access, and the associated applications that utilize those ports on the host device 154. Although the applications are capable of executing on the host device 154, once application data is forwarded through the communications tunnel 122, as described below, a particular selected application executes on the guest device 104 using the application data received from the host device 154.

A list of the ports and associated applications on the host device 154 that the guest device 104/local device 1004 is allowed to access may be transmitted at step 416 from the security server 158 to the host device 154. At step 418, the list of the ports and associated applications on the host device 154 that the guest device 104/local device 1004 is allowed to access may then be transmitted from the host device 154 to the guest device 104/local device 1004 through the communications tunnel 122. The list may be presented to a user of the guest device 104, for example, and the user may select one of the ports and its associated application that the user wishes to access. The selection of the desired port and its associated application may be received at step 420 from the guest device 104 at the host device 154 through the communications tunnel 122. In some embodiments, steps 416, 418, and 420 may be optional, such as if a user of the guest device 104/local device 1004 already knows the desired port and/or associated application. In this case, the user may directly enter the desired port and/or associated application without being presented a list.

After receiving the selection of the desired port and its associated application, application data may be forwarded at step 422 between the port on the host device 154 and a port of the guest device 104/local device 1004 through the communications tunnel 122. The forwarding of the application data may persist for the duration of the session, e.g., while the session is active. The port of the guest device 104/local device 1004 may be dynamically selected by the guest device 104/local device 1004 based on available free ports on the guest device 104/local device 1004. In particular, the guest device 104/local device 1004 may internally store an associated list of dynamically chosen ports of the guest device 104/local device 1004 and corresponding ports on the host device 104. In this way, the guest device 104/local device 1004 may have knowledge of which port(s) to utilize when forwarding application data back to the host device 154. Data on the particular selected port on the host device 154 may also be mapped, stored, and forwarded to a corresponding port on the guest device 104/local device 1004. Only the selected allowed port may be utilized for remote access while other ports are restricted from being used. Any port on the host device 154 and any port on the guest device 104/local device 1004 may be utilized to forward the application data. In one embodiment, random automated selection of a port to use can be performed at one or more the devices described herein, prior to establishing each communications session, thereby making the port used during the next communications session very difficult to predict. Randomness can be established using known randomness techniques.

The application data may include graphical data, text data, binary data, and/or other data that enables the user of the guest device 104 to execute and interact with the application on the guest device 104 based on the received application data. For example, if the desired application is a web browser, then the application data may include the HTML source code that defines the content and layout of webpages. As another example, if the desired application is a command window, then the application data may include text data for prompts, menu options, etc. Events that have occurred while the session is active and their corresponding timestamps may be logged at step 424. The events may be logged by the security server 158 to a log database 160, for example.

Figure 9:
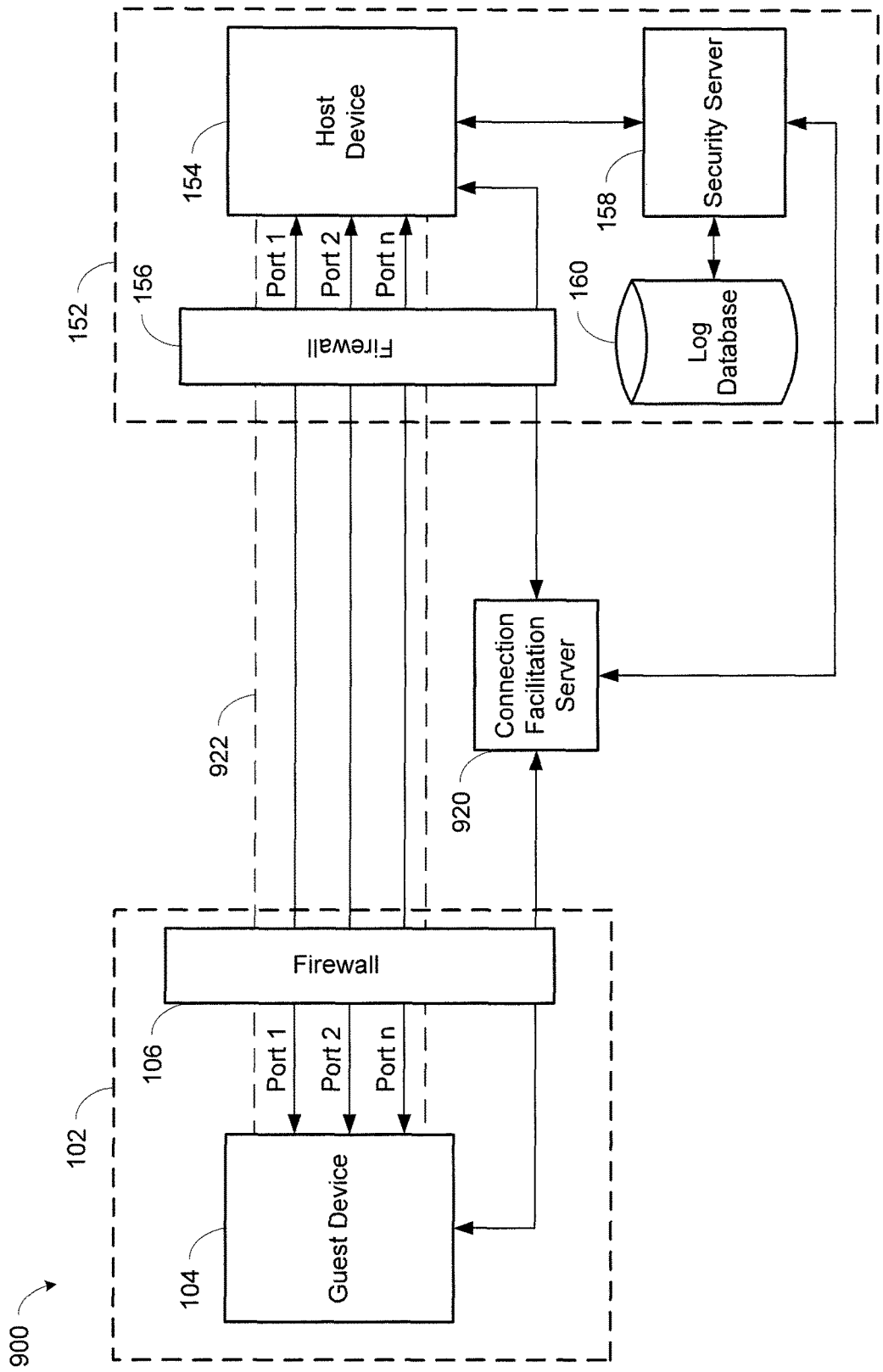
FIG. 9 is a block diagram illustrating an exemplary remote access system of FIG. 1 in which the communications tunnel is a direct peer-to-peer connection between the guest device and the host device.

FIG. 9 illustrates a remote access system 900 for transporting data through a communications tunnel 922 between a guest device 104 and a host device 154 over a network. The components of the remote access system 900, such as the guest device 104, host device 154, and security server 158 are the same as described above in the remote access system 100 of FIG. 1. However, in the remote access system 900, the communications tunnel 922 does not transport data through the connection facilitation server 920. Instead, the communications tunnel 922 is a direct peer-to-peer connection between the guest device 104 and the host device 154. The guest device 104 and the host device 154 may still communicate with the connection facilitation server 920 for the initial handshake, authentication of the guest device 104, and determination of the role of the guest device 104. However, once the role of the guest device 104 is determined, data may be forwarded between the guest device 104 and the host device 154 through the communications tunnel 922 that does not use the connection facilitation server 920. In particular, data may be forwarded directly between the port on the host device 154 and a port of the guest device 104 through the communications tunnel 922.

Figure 2:
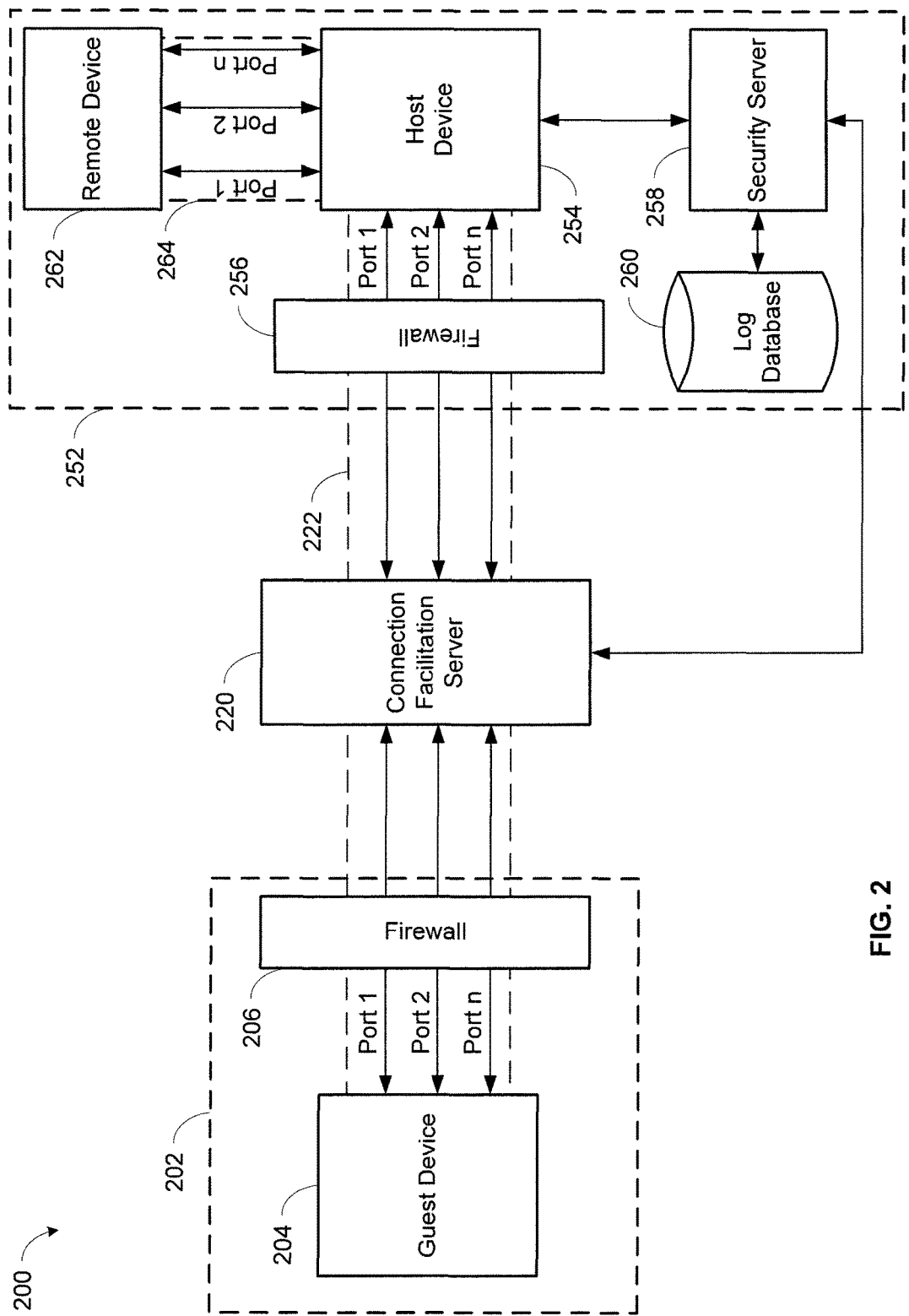
FIG. 2 is a block diagram illustrating an exemplary remote access system for transporting data through a communications tunnel between a guest device and a remote device via a host device.

Referring to FIG. 2, a remote access system 200 is shown for transporting data through a communications tunnel 222 between a guest device 204 and a remote device 262 over a network, such as the Internet. The communications tunnel 222 may be through a host device 254 and a connection facilitation server 220. The remote device 262 may include, for example, a building control system (e.g., HVAC system, lighting system, etc.), an industrial control system (e.g., power control system, manufacturing equipment control system, etc.), a printer, a copier, a network component (e.g., switch, router, etc.), and/or another device with networking capability. The remote device 262 may not be compatible with the requisite software to enable remote access, for example, but can be in communication with the host device 254 to enable remote access from the guest device 204 to the remote device 262. The guest device 204, the host device 254, and the remote device 262 may generally include any processor-based system that has networking capability. Although FIG. 2 shows a single remote device 262 in communication with the host device 254 for simplicity, it is contemplated that any number of remote devices 262 may be in communication with the host device 254.

The remote access system 200 provides remote access from the guest device 204 to the remote device 262 through the intermediary host device 254 without needing prior knowledge of the configuration of the remote device 262. Secure access to the remote device 262 may be enabled according to security policies that can vary on a per-session basis that takes into account various factors. The role of the guest device 204, including the remote ports and associated applications that the guest device 204 is allowed to access, may be determined by a security server 258 so that applicable security policies are enforced. Application data may be forwarded between the remote device 262 and the guest device 204 through a remote port on the remote device 262, the host device 254, the communications tunnel 122, and a port of the guest device 204.

The guest device 204 may be located at a first location 202 and the remote device 262 and the host device 254 may be located at another location 252 remote from the first location. The remote device 262 and the host device 254 may be in communication over a local area network 264, for example. A firewall 206 may control traffic between the guest device 204 and devices external to the location 202, and similarly, a firewall 256 may control traffic between the remote device 262 and the host device 254 and devices external to the location 252. The firewalls 206 and 256 may be software-based or hardware-based, as is known in the art. The firewalls 206 and 256 do not need to have any inbound ports open, which can remove vulnerabilities to network breaches.

The connection facilitation server 220 may be external to both the guest device 204 at the location 202, and the remote device 262 and the host device 254 at the location 252. The connection facilitation server 220 may serve as a routing point for both the guest device 204 and the host device 254. In particular, the guest device 204 and the host device 254 may each make outbound connections to the connection facilitation server 220, which can then create the communications tunnel 222 to connect the guest device 204 and the remote device 262, as described below. The guest device 204 and the host device 254 may each communicate connection requests, keep alive signals, and/or other data and information to the connection facilitation server 220. In some embodiments, the connection facilitation server 220 may include one or more connection servers and/or one or more connection managers to assist in creating the communications tunnel 222.

A security server 258 may be in communication with the host device 254 at the location 252. The security server 258 may also be in communication with the connection facilitation server 220. In some embodiments, the security server may be external to the location 252 and also be in communication with the host device 254, similar to the embodiment shown in FIG. 8 with the security server 858. The security server 258 may be utilized to implement security policies and standards. The security policies and standards may be set by an organization, such as a corporation, to define levels of access to computing resources of the organization. The levels of access may vary on a per-session basis, such as based on the user, the type of remote connection, date, time, connection origin, and/or other factors.

The security server 258 may store and log events and corresponding timestamps when the events occurred to a log database 260. The events may have occurred during a session between the guest device 204 and the host device 254 (on behalf of the remote device 262) over the communications tunnel 222. For example, the events may include that a session was established, that the guest device 204 was authenticated successfully, that data is being forwarded from the remote device 262 through an allowed remote port, and/or that a session was ended. Other events that may be logged include whether the communications tunnel access was confirmed or denied (e.g., if the user on the host device 254 specifically approved or denied access to the guest device 204), whether the communications tunnel 222 was created successfully or not, whether the communications tunnel 222 was connected or disconnected, and/or whether the connection was lost between the guest device 204 and the host device 254. The log database 260 may include logs of each established session that provide a full audit trail for compliance and legal purposes. The logging of events may be performed at different levels, such as basic packet logging (which is application independent) or application specific logging (which may include recording screen activity, audio transmission, etc.).

Each of the guest device 204 and the host device 254 may perform an initial handshake with the connection facilitation server 220, including connecting and authenticating to the connection facilitation server 220. The host device 254 may transmit to connection facilitation server 220 an identification of the host device 254. The guest device 204 may request a list of host devices 254 from the connection facilitation server 220 that are accessible to the guest computer 204. If the guest device 204 is authenticated and validated to the connection facilitation server 220, the guest device 204 may receive a host list among which might be also the host device 254. From the list of host devices 254, a user at the guest device 204 may select a particular host device 254 that the user wishes to access.

Figure 5:
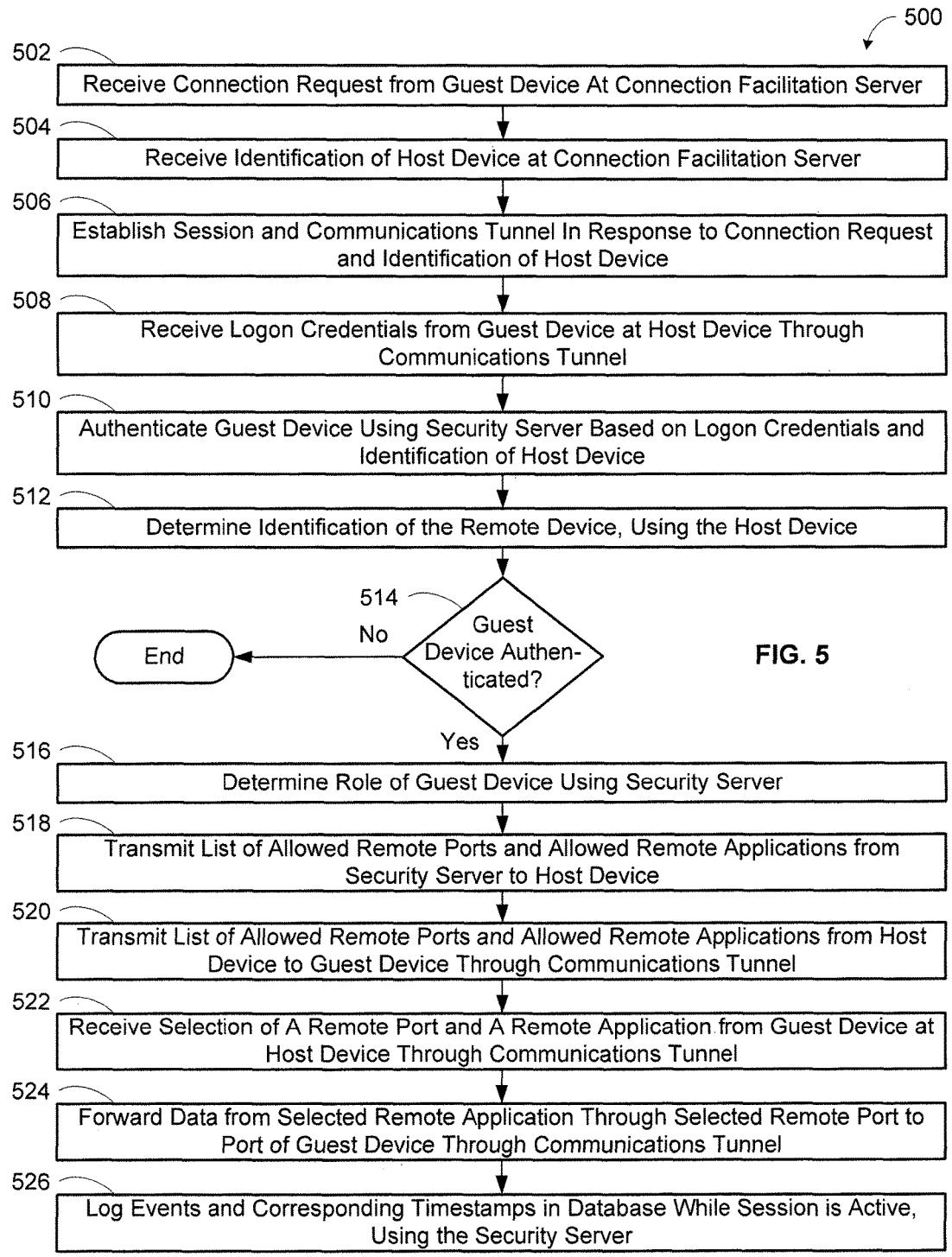
FIG. 5 is a flowchart illustrating operations for transporting data through a communications tunnel between a guest device and a remote device via a host device.

Referring to FIG. 5, an embodiment of a process 500 is shown for transporting data through a communications tunnel 222 between a guest device 204 and a remote device 262 over a network, using the system 200 of FIG. 2. At step 502, a connection request may be received from the guest device 204 at the connection facilitation server 220 that denotes that the guest device 204 desires to establish the communications tunnel 222 with the host device 254 and a remote device 262. The connection request may include an identification of the desired host device 254 and the desired remote device 262, for example. The connection facilitation server 220 may also receive an identification of the host device 254 at step 504 from the host device 254 to indicate that the host device 254 is available for connection, such as during the initial handshake described above. The identification of the host device 254 may be a unique identifier of the host device 254. The identification of the host device 254 may be a unique identifier of the host device 254, and may include an arbitrary name, such as a static name, a DNS name of the host device 254, or a combination of environment variables (e.g., MAC address, IP address, username, etc.).

The communications tunnel 222 and a session may be established at step 506, in response to receiving the connection request and the identification of the host device 254. In particular, if the identification of the desired host device 254 in the connection request matches the identification of a host device 254 that is available for connection, then the communications tunnel 222 and the session may be established. The communications tunnel 222 may be established such that data can be securely exchanged between the guest device 204 and the host device 254, such as authentication data, application data, and/or other data. When application data is exchanged, as described further below, the application data may be forwarded between the remote device 262 and the guest device 204 through a remote port of the remote device 262, the host device 154, the communications tunnel 222, and a port of the guest device 204.

At step 508, logon credentials may be received from the guest device 204 at the host device 254 through the communications tunnel 222. The logon credentials may correspond to a user of the guest device 204 and include a username, password, security certificate information, key cryptography information, smartcard information, and/or other credentials. Authentication of the guest device may be performed at step 510 using the security server 258 based on the logon credentials and the identification of the host device 254. The host device 254 may have passed the logon credentials to the security server 258, for example. The security server 258 may authenticate the logon credentials depending on the authentication type appropriate for the logon credentials and the user, and/or may receive confirmation of the authentication from other entities, such as an authentication authority. For example, the authentication type may be based on protocols such as Active Directory, LDAP (Lightweight Directory Access Protocol), RADIUS (Remote Authentication Dial In User Service), RSA, and/or other protocols. Embodiments of steps 508 and 510 with regards to receiving logon credentials and authenticating the guest device 204 are described below with respect to FIGS. 6 and 7.

At step 512, an identification of the remote device 262 may be determined by the host device 254. The host device 254 may, for example, include a router or other network component to search for remote devices 262 that may be in communication with the host device 254. The identification of the remote device 262 may include a unique identifier of the remote device 262, a name of the remote device 262, and/or other identifying information. The host device 254 may scan for remote devices 262 in its network, have a stored list of remote devices 262, and/or receive a list of remote devices 262 from the connection facilitation server 220.

It may be determined at step 514 whether the guest device 204 has been authenticated by the security server 258. If the guest device 204 has not been successfully authenticated at step 514, then the process 500 may be complete and the session may be ended. However, if the guest device 204 is successfully authenticated at step 514, then the process 500 may continue to step 516. At step 516, the role of the guest device 204 may be determined by the security server 258, based on the logon credentials, an identification of the remote device 262, a date, a time, an identification of the guest device 204, an identification of the host device 254, a connection type between the guest device 204 and the connection facilitation server 220, the authentication type, and/or other factors. The security server 258 may determine the role of the guest device 204 based on security policies and standards set within the security server 258. The logon credentials may indicate an identity of the user of the guest device 204 and therefore the level of access, e.g., ports and applications, the user should have on the remote device 262.

The role of the guest device 204 may include the ports on the remote device 262 that the guest device 204 is allowed to access, and/or the associated applications that utilize those ports on the remote device 262. Although the applications are capable of executing on the remote device 262, once application data is forwarded through the communications tunnel 222, as described below, a particular selected application executes on the guest device 204 using the application data received from the remote device 262 through the host device 254.

A list of the ports and/or associated applications on the remote device 262 that the guest device 204 is allowed to access may be transmitted at step 518 from the security server 258 to the host device 254. At step 520, the list of the ports and/or associated applications on the remote device 262 that the guest device 204 is allowed to access may then be transmitted from the host device 254 to the guest device 204 through the communications tunnel 222. The list may be presented to a user of the guest device 204, for example, and the user may select one of the ports and/or its associated application that the user wishes to access. The selection of the desired port and its associated application may be received at step 522 from the guest device 204 at the host device 254 through the communications tunnel 222. In some embodiments, steps 518, 520, and 522 may be optional, such as if a user of the guest device 204 already knows the desired port and/or associated application. In this case, the user may directly enter the desired port and/or associated application without being presented a list.

After receiving the selection of the desired port and its associated application, application data may be forwarded at step 524 between the port on the remote device 262 and a port of the guest device through the host device 254 and the communications tunnel 222. The forwarding of the application data may persist for the duration of the session, e.g., while the session is active. The port of the guest device 204 may be dynamically selected by the guest device 204 based on available free ports on the guest device 204. In particular, the guest device 204 may internally store an associated list of dynamically chosen ports of the guest device 204 and corresponding ports on the remote device 262. In this way, the guest device 204 may have knowledge of which port(s) to utilize when forwarding application data back to the remote device 262. Data on the particular selected port on the remote device 262 may be mapped and forwarded to a corresponding port on the guest device 204 via the host device 254. Only the selected allowed port may be utilized for remote access while other ports are restricted from being used. Any port on the remote device 262 and any port on the guest device 204 may be utilized to forward the application data. The port on the guest device 204 may be dynamically assigned from the available free ports on the guest device 204. The application data may include graphical data, text data, binary data, and/or other data that enables the user of the guest device 204 to execute and interact with the application on the guest device 204 based on the received application data. Events that have occurred while the session is active and their corresponding timestamps may be logged at step 526. The events may be logged by the security server 258 to a log database 260, for example.

Figure 6:
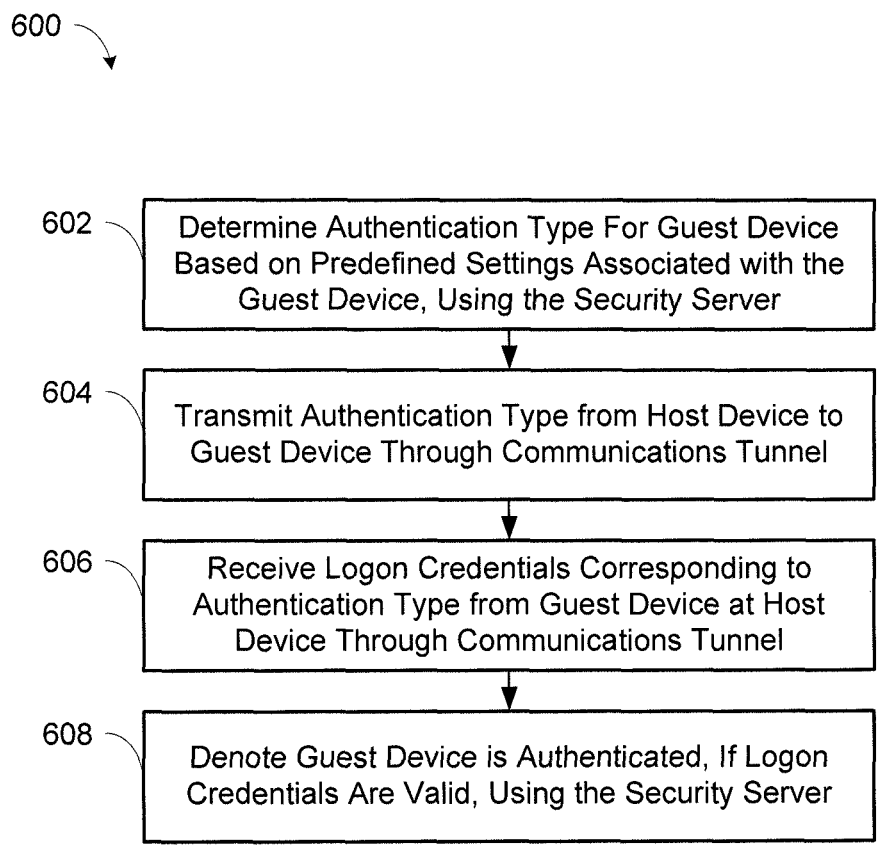
FIG. 6 is a flowchart illustrating operations for an embodiment of receiving logon credentials and authenticating a guest device.

FIG. 6 shows an embodiment of a process 600 for receiving logon credentials and authenticating a guest device 104, 204 in conjunction with the process 400 of FIG. 4 or the process 500 of FIG. 5. The process 600 may perform authentication from the guest device 104, 204 through the host device 154, 254 and the security server 158, 258. The process 600 may include embodiments of the steps 408, 410, 508, and 510, as described above. At step 602, an authentication type for the guest device 104, 204 may be determined by the security server 158, 258, based on predefined settings associated with the guest device 104, 204 on the security server 158. A particular authentication type, such as based on protocols like Active Directory, LDAP, RADIUS, RSA, etc., may be associated with the guest device 104, 204. At step 604, the determined authentication type may be transmitted from the host device 154, 254 to the guest device 104, 204 through the communications tunnel 122, 222. In this way, a user of the guest device 104, 204 will be informed as to what logon credentials and authentication type are necessary to successfully access the host device 154, 254 (and associated remote devices 262). Logon credentials may be received at step 606 from the guest device 104, 204 at the host device 154, 254 through the communications tunnel 122, 222. At step 608, the guest device 104, 204 may be denoted as authenticated using the security server 158, 258, if the logon credentials are deemed valid.

Figure 7:
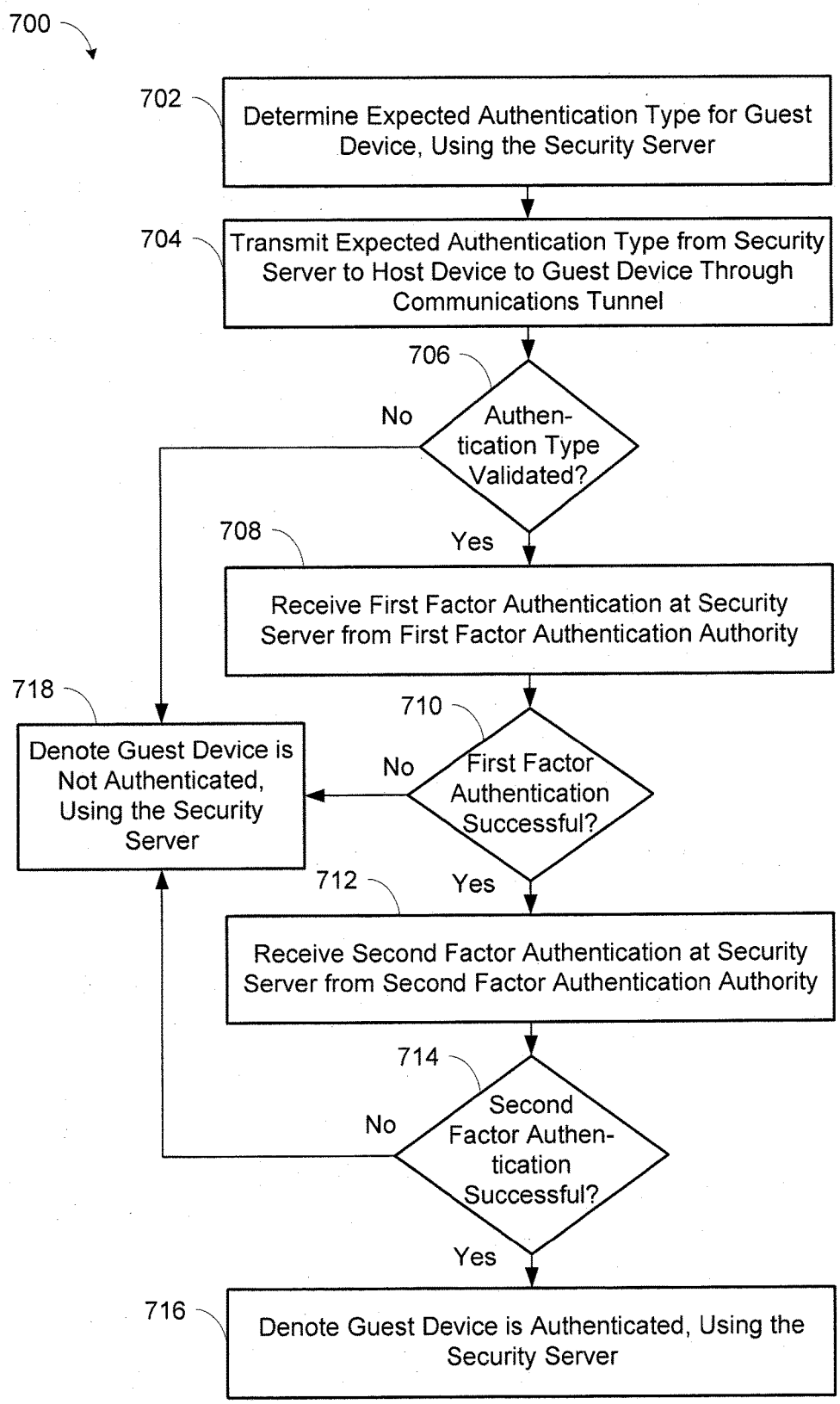
FIG. 7 is a flowchart illustrating operations for an embodiment of authenticating a guest device.

FIG. 7 shows an embodiment of a process 700 for authenticating a guest device in conjunction with the process 400 of FIG. 4 or the process 500 of FIG. 5. The process 700 may utilize two-factor authentication from the guest device 104, 204 using the security server 158, 258. The process 700 may include embodiments of the steps 410 and 510, as described above. At step 702, an expected authentication type for the guest device 104, 204 may be determined by the security server 158, 258. The expected authentication type may have been predefined by the security server 158, 258, for example. The identified authentication type may be transmitted at step 704 from the security server 158, 258 to the guest device 104, 204.

At step 706, it may be determined whether the authentication type has been validated against the expected authentication type for the guest device 104, 204. If the authentication type has not been validated, then the process 700 continues to step 718 where the security server 158, 258 may denote that that the guest device 104, 204 is not authenticated. However, if the authentication type is validated, then the process 700 continues to step 708. At step 708, a first factor authentication may be received at the security server 158, 258 from a first factor authentication authority. The first factor authentication authority may denote whether the first factor authentication, e.g., Active Directory, LDAP, smart-card information, etc., is successful or unsuccessful. Portions of the logon credentials may have been utilized by the first factor authentication authority to determine whether the first factor authentication is successful or unsuccessful, for example. If the first factor authentication is not successful at step 710, then the process 700 may continue to step 718 and the security server 158, 258 may denote that that the guest device 104, 204 is not authenticated. However, if the first factor authentication is successful at step 710, then the process 700 may continue to step 712.

At step 712, a second factor authentication may be received at the security server 158, 258 from a second factor authentication authority. The second factor authentication authority may denote whether the second factor authentication, e.g., RSA, RADIUS, etc., is successful or unsuccessful. Portions of the logon credentials may have been utilized by the second factor authentication authority to determine whether the second factor authentication is successful or unsuccessful, for example. If the second factor authentication is not successful at step 714, then the process 700 may continue to step 718 and the security server 158, 258 may denote that that the guest device 104, 204 is not authenticated. However, if the second factor authentication is successful at step 714, then the process 700 may continue to step 716. At step 716, the security server 158, 258 may denote that the guest device 104, 204 is authenticated.

Figure 3:
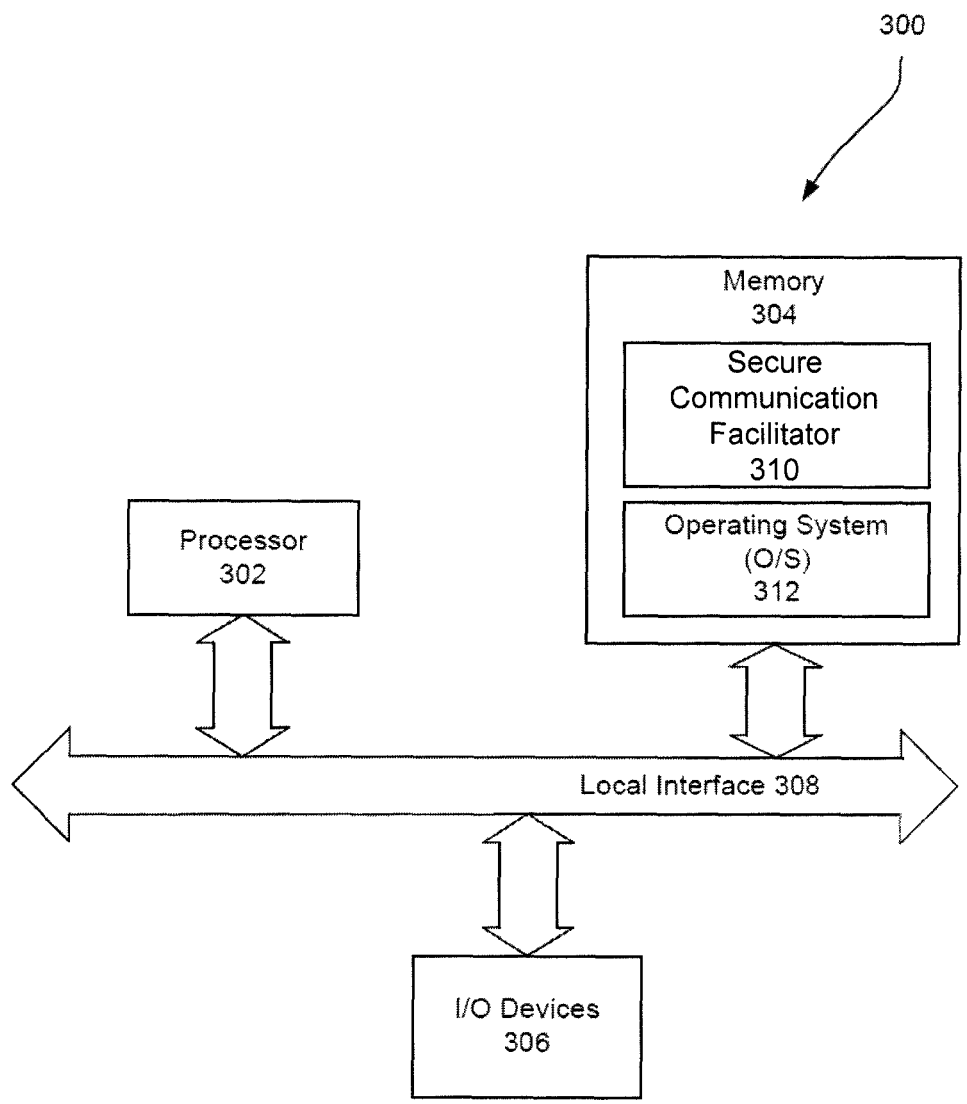
FIG. 3 is a block diagram of one form of a computer or server, having a memory element with a computer readable medium for implementing components of a remote access system.

Referring to FIG. 3, a block diagram of a computing device 300 housing executable software used to facilitate the systems 100, 200, 800, 900, and 1000 is shown. One or more instances of the computing device 300 may be utilized to implement any, some, or all of the components in the systems 100, 200, 800, 900, and 1000, as well as any other computing device, firewall, server, database, or other computing or computer related device referred to or mentioned herein and/or in the figures, which are all now referred herein as a "computing device" 300. Examples of some of the computing devices 300 include the local device 1004, the guest device 1002, the host device 1054, and the remote device 1062 of system 1000. Computing device 300 includes a memory element 304. Memory element 304 may include a computer readable medium for implementing a secure communication facilitator 310, and for implementing particular system transactions. Memory element 304 may also be utilized to implement databases. Computing device 300 also contains executable software, some of which may or may not be unique to the systems 100, 200, 800, 900, and 1000.

In some embodiments, the secure communication facilitator 310 is implemented in software, as an executable program, and is executed by one or more special or general purpose digital computer(s), such as a mainframe computer, a personal computer (desktop, laptop or otherwise), personal digital assistant, or other handheld computing device. Therefore, computing device 300 may be representative of any computer in which the systems 100, 200, 800, 900, and 1000 reside or partially reside.

Generally, in terms of hardware architecture as shown in FIG. 3, computing device 300 includes a processor 302, a memory 304, and one or more input and/or output (I/O) devices 306 (or peripherals) that are communicatively coupled via a local interface 308. Local interface 308 may be one or more buses or other wired or wireless connections, as is known in the art. Local interface 308 may have additional elements, which are omitted for simplicity, such as controllers, buffers (caches), drivers, transmitters, and receivers to facilitate external communications with other like or dissimilar computing devices. Further, local interface 308 may include address, control, and/or data connections to enable internal communications among the other computer components.

Processor 302 is a hardware device for executing software, particularly software stored in memory 304. Processor 302 can be any custom made or commercially available processor, such as, for example, a Core series or vPro processor made by Intel Corporation, a Phenom, Athlon or Sempron processor made by Advanced Micro Devices, Inc., or an ARM-based processor from ARM Holdings plc. In the case where computing device 300 is a server, the processor may be, for example, a Xeon or Itanium processor from Intel, an Opteron-series processor from Advanced Micro Devices, Inc., or an or an ARM-based processor from ARM Holdings plc. Processor 302 may also represent multiple parallel or distributed processors working in unison.

Memory 304 can include any one or a combination of volatile memory elements (e.g., random access memory (RAM, such as DRAM, SRAM, SDRAM, etc.)) and non-volatile memory elements (e.g., ROM, hard drive, flash drive, CDROM, etc.). It may incorporate electronic, magnetic, optical, and/or other types of storage media. Memory 304 can have a distributed architecture where various components are situated remote from one another, but are still accessed by processor 302. These other components may reside on devices located elsewhere on a network, or in a cloud arrangement.

The software in memory 304 may include one or more separate programs. The separate programs comprise ordered listings of executable instructions for implementing logical functions. In the example of FIG. 3, the software in memory 304 may include the secure communication facilitator 310 in accordance with the invention, and a suitable operating system (O/S) 312. Examples of suitable commercially available operating systems 312 are Windows operating systems available from Microsoft Corporation, Mac OS X available from Apple Computer, Inc., a Unix operating system from AT&T, or a Unix-derivative such as BSD or Linux. The operating system O/S 312 will depend on the type of computing device 300. For example, if the computing device 300 is a PDA or handheld computer, the operating system 312 may be iOS for operating certain devices from Apple Computer, Inc., PalmOS for devices from Palm Computing, Inc., Windows Phone 8 from Microsoft Corporation, Android from Google, Inc., or Symbian from Nokia Corporation. Operating system 312 essentially controls the execution of other computer programs, and provides scheduling, input-output control, file and data management, memory management, and communication control and related services.

If computing device 300 is an IBM PC compatible computer or the like, the software in memory 304 may further include a basic input output system (BIOS). The BIOS is a set of essential software routines that initialize and test hardware at startup, start operating system 312, and support the transfer of data among the hardware devices. The BIOS is stored in ROM so that the BIOS can be executed when computing device 300 is activated.

Steps and/or elements, and/or portions thereof of the invention may be implemented using a source program, executable program (object code), script, or any other entity comprising a set of instructions to be performed. Furthermore, the software embodying the invention can be written as (a) an object oriented programming language, which has classes of data and methods, or (b) a procedural programming language, which has routines, subroutines, and/or functions, for example but not limited to, C, C++, C#, Pascal, Basic, Fortran, Cobol, Perl, Java, Ada, Python, and Lua. Components of the secure communication facilitator 310 may also be written in a proprietary language developed to interact with these known languages.

I/O device 306 may include input devices such as a keyboard, a mouse, a scanner, a microphone, a touch screen, a bar code reader, or an infra-red reader. It may also include output devices such as a printer, a video display, an audio speaker or headphone port or a projector. I/O device 306 may also comprise devices that communicate with inputs or outputs, such as a short-range transceiver (RFID, Bluetooth, etc.), a telephonic interface, a cellular communication port, a router, or other types of network communication equipment. I/O device 306 may be internal to computing device 300, or may be external and connected wirelessly or via connection cable, such as through a universal serial bus port.

When computing device 300 is in operation, processor 302 is configured to execute software stored within memory 304, to communicate data to and from memory 304, and to generally control operations of computing device 300 pursuant to the software. The secure communication facilitator 310 and operating system 312, in whole or in part, may be read by processor 302, buffered within processor 302, and then executed.

In the context of this document, a "computer-readable medium" may be any means that can store, communicate, propagate, or transport data objects for use by or in connection with the secure communication facilitator 310. The computer readable medium may be for example, an electronic, magnetic, optical, electromagnetic, infrared, or semiconductor system, apparatus, device, propagation medium, or any other device with similar functionality. More specific examples (a non-exhaustive list) of the computer-readable medium would include the following: an electrical connection (electronic) having one or more wires, a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via, for instance, optical scanning of the paper or other medium, then compiled, interpreted or otherwise processed in a suitable manner if necessary, and stored in a computer memory. The secure communication facilitator 310 can be embodied in any type of computer-readable medium for use by or in connection with an instruction execution system or apparatus, such as a computer.

For purposes of connecting to other computing devices, computing device 300 is equipped with network communication equipment and circuitry. In a preferred embodiment, the network communication equipment includes a network card such as an Ethernet card, or a wireless connection card. In a preferred network environment, each of the plurality of computing devices 300 on the network is configured to use the Internet protocol suite (TCP/IP) to communicate with one another. It will be understood, however, that a variety of network protocols could also be employed, such as IEEE 802.11 Wi-Fi, address resolution protocol ARP, spanning-tree protocol STP, or fiber-distributed data interface FDDI. It will also be understood that while a preferred embodiment of the invention is for each computing device 300 to have a broadband or wireless connection to the Internet (such as DSL, Cable, Wireless, T-1, T-3, OC3 or satellite, etc.), the principles of the invention are also practicable with a dialup connection through a standard modem or other connection means. Wireless network connections are also contemplated, such as wireless Ethernet, satellite, infrared, radio frequency, Bluetooth, near field communication, and cellular networks.

Any process descriptions or blocks in figures should be understood as representing modules, segments, or portions of code which include one or more executable instructions for implementing specific logical functions or steps in the process, and alternate implementations are included within the scope of the embodiments of the present invention in which functions may be executed out of order from that shown or discussed, including substantially concurrently or in reverse order, depending on the functionality involved, as would be understood by those having ordinary skill in the art.

Referring to FIG. 10, a remote access system 1000 is shown for transporting data through a communications tunnel 1022 between a local device 1004 and a remote device 1062 over a network, such as the Internet, in which the communications tunnel established between the local device 1004 and the host device 1054 (and/or the remote device 1062) may be through the guest device 1002, such as the guest device 104, 204 from other embodiments described herein. The communications tunnel 1022 may be through a connection facilitation server 1020. Alternatively, the communications tunnel 1022 does not need to be through a connection facilitation server 1020, and may be direct, as shown and described in relation to FIG. 9. As provided herein, the remote device 1062 may include, for example, a building control system (e.g., HVAC system, lighting system, etc.), an industrial control system (e.g., power control system, manufacturing equipment control system, etc.), a printer, a copier, a network component (e.g., switch, router, etc.), and/or another device with networking capability. The remote device 1062 may not be compatible with the requisite software to enable remote access, for example, but can be in communication with the host device 1054 to enable remote access from the local device 1004 to the remote device 1062. The local device 1004, guest device 1002, the host device 1054, and the remote device 1062 may generally include any processor-based system that has networking capability. Although FIG. 2 shows a single remote device 1062 in communication with the host device 1054 for simplicity, it is contemplated that any number of remote devices 1062 may be in communication with the host device 1054.

The remote access system 1000 provides remote access from the local device 1004 to the remote device 262 through the intermediary guest device 1002 and host device 1054 without needing prior knowledge of the configuration of the remote device 1062. Secure access to the remote device 1062 may be enabled according to security policies that can vary on a per-session basis that takes into account various factors. The role of the local device 1004, including the remote ports and associated applications that the local device 1004 and/or guest device 1002 is allowed to access, may be determined by a security server 1058 so that applicable security policies are enforced. Application data may be forwarded between the remote device 1062 and the local device 1004 through a remote port on the remote device 1062, the host device 1054, the communications tunnel 1022, a port of the guest device 1002, and a port on the local device 1004.

The local device 1004 and guest device 1002 may be located at a first location 1008 and the remote device 1062 and the host device 1054 may be located at another location 1052 remote from the first location. The local device 1004 can also be located remotely from the guest device 1002. The remote device 1062 and the host device 1054 may be in communication over a local area network 1064, for example. A firewall 1006 may control traffic between the local device 1004 and guest device 1002 and devices external to the location 1008, and similarly, a firewall 1056 may control traffic between the remote device 1062 and the host device 1054 and devices external to the location 1052. The firewalls 1006 and 1056 may be software-based or hardware-based, as is known in the art. The firewalls 1006 and 1056 do not need to have any inbound ports open, which can remove vulnerabilities to network breaches. The local device 1004 and the guest device 1002 may be in communication over a network 1070, such as a local area network, for example, or another type of network or communications path or tunnel. The local device(s) 1004 can include a personal computer, laptop computer, hand held computing device (iPhone, iPad, etc.), or other computing device, and the guest device 1002 can be a computer server or other computing device, as is explained herein relative to other embodiments. Although FIG. 10 shows a single local device 1004 in communication with the guest device 1002 for simplicity, it is contemplated that any number of local devices 1004 may be in communication with the guest device 1002.

The connection facilitation server 1020 may be external to both the local device 1004/guest device 1002 at the location 1008, and the remote device 1062/the host device 1054 at the location 1052. The connection facilitation server 1020 may serve as a routing point for the guest device 1002 (for local device 1004), and for the host device 1054 (for the remote device 1062). In particular, the guest device 1002 (for the local device 1004) and the host device 1054 (for the remote device 1062) may each make outbound connections to the connection facilitation server 1020, which can then create the communications tunnel 1022 to connect the local device 1004 and the remote device 1062, as described below. The guest device 1002 and the host device 1054 may each communicate connection requests, keep alive signals, and/or other data and information to the connection facilitation server 1020. In some embodiments, the connection facilitation server 1020 may include one or more connection servers and/or one or more connection managers to assist in creating the communications tunnel 1022.

A security server 1058 may be in communication with the host device 1054 at the location 1052 as explained herein. The security server 1058 may also be in communication with the connection facilitation server 1020. In some embodiments, the security server may be external to the location 1052 and also be in communication with the host device 1054, similar to the embodiment shown in FIG. 8 with the security server 858. The security server 1058 may be utilized to implement security policies and standards. The security policies and standards may be set by an organization, such as a corporation, to define levels of access to computing resources of the organization. The levels of access may vary on a per-session basis, such as based on the user, the type of remote connection, date, time, connection origin, and/or other factors.

The security server 1058 may store and log events and corresponding timestamps when the events occurred to a log database 1060 in similar fashion as described herein. The events may have occurred during a session between the guest device 1002 (on behalf of local device 1004) and the host device 1054 (on behalf of the remote device 1062) over the communications tunnel 1022. For example, the events may include that a session was established, that the guest device 1002 (and/or respective local device 1004) was authenticated successfully, that data is being forwarded from the remote device 1062 through an allowed remote port, and/or that a session was ended. Other events that may be logged include whether the communications tunnel access was confirmed or denied (e.g., if the user on the host device 1054 specifically approved or denied access to the local device 1004 and/or guest device 1002), whether the communications tunnel 1022 was created successfully or not, whether the communications tunnel 1022 was connected or disconnected, and/or whether the connection was lost between the local device 1002 (and/or guest device 1002) and the host device 1054. The log database 1060 may include logs of each established session that provide a full audit trail for compliance and legal purposes. The logging of events may be performed at different levels, such as basic packet logging (which is application independent) or application specific logging (which may include recording screen activity, audio transmission, etc.).

Each of the guest device 1002 (and/or local device 1004) and the host device 1054 may perform an initial handshake with the connection facilitation server 1020, including connecting and authenticating to the connection facilitation server 1020. The host device 1054 may transmit to connection facilitation server 1020 an identification of the host device 1054. The guest device 1002 (and/or local device 1004) may request a list of host devices 1054 from the connection facilitation server 1020 that are accessible to the guest device 1002 (and/or local device 1004). If the guest device 1002 (and/or local device 1004) is authenticated and validated to the connection facilitation server 1020, the guest device 1002 (and/or local device 1004) may receive a host list among which might be also the host device 1054. From the list of host devices 1054, a user at the guest device 1002 (and/or local device 1004) may select a particular host device 1054 that the user wishes to access.

It should be emphasized that the above-described embodiments of the present invention, particularly, any "preferred" embodiments, are possible examples of implementations, merely set forth for a clear understanding of the principles of the invention. Many variations and modifications may be made to the above-described embodiment(s) of the invention without substantially departing from the spirit and principles of the invention. All such modifications are intended to be included herein within the scope of this disclosure and the present invention and protected by the following claims.

The invention claimed is:

1. A method for transporting data between a host device and a guest device remote from the host device through a communications tunnel, wherein the communications tunnel is through a connection facilitation server in communication with the host device and the guest device over a network, and the data transported between the host device and the guest device is through at least one port of the host device, the communications tunnel, and at least one port of the guest device, the method comprising:
   (A) receiving, at the connection facilitation server, a connection request from the guest device to establish the communications tunnel with the host device;
   (B) receiving, at the connection facilitation server, an identification of the host device for indicating to the connection facilitation server that the host device is available for connection to the guest device, wherein the identification of the host device is a unique identifier associated with the host device;
   (C) establishing a session and the communications tunnel between the guest device and the host device via the connection facilitation server, in response to receiving the connection request and the identification of the host device;
   (D) receiving logon credentials from the guest device at the host device through the communications tunnel;
   (E) authenticating the guest device based on the logon credentials and the identification of the host device, using a security server in communication with the host device;
   (F) when the guest device is authenticated, using the security server, determining a role of the guest device based on the (i) logon credentials and (ii) one or more of a date, a time, an identification of the guest device, an identification of the host device, a connection type between the guest device and the connection facilitation server, or an authentication type, wherein the role comprises a plurality of allowed host ports that the guest device is authorized to access and plurality of allowed host applications associated with the plurality of allowed host ports, the plurality of allowed host applications capable of executing on the host device;
   (G) transmitting a list of the plurality of allowed host ports and the plurality of allowed host applications from the security server to the host device;
   (H) transmitting the list of the plurality of allowed host ports and the plurality allowed host applications from the host device to the guest device through the communications tunnel;
   (I) receiving a selection of one of the plurality of allowed host ports and the plurality of allowed host applications from the guest device at the host device through the communications tunnel; and
   (J) forwarding the data from the selected allowed host application through the selected allowed host port, the communications tunnel, and one of a plurality of available ports of the guest device, while the session is active, wherein the selected one of the plurality of available ports of the guest device is dynamically selected by the guest device independently of the selected allowed host application and the selected one of the plurality of allowed host port.

2. The method of claim 1, wherein:
   receiving the logon credentials comprises:
      determining an authentication type for the guest device, using the security server, based on predefined settings associated with the guest device on the security server;
      transmitting the authentication type from the host device to the guest device through the communications tunnel; and
      receiving the logon credentials corresponding to the authentication type from the guest device at the host device through the communications tunnel; and
   authenticating the guest device comprises denoting that the guest device is authenticated, using the security server, when the logon credentials are valid.

3. The method of claim 1, wherein authenticating the guest device comprises:
   determining an expected authentication type for the guest device based on predefined settings associated with the guest device on the security server, using the security server;
   transmitting the expected authentication type for the guest device from the security server to the host device and the guest device;
   receiving a first factor authentication at the security server from a first factor authentication authority, when the authentication type is validated;
   receiving a second factor authentication at the security server from a second factor authentication authority, when the first factor authentication is successful; and
   denoting that the guest device is authenticated, using the security server, when the first factor authentication and the second factor authentication are successful.

4. The method of claim 1, further comprising logging events and corresponding timestamps to a database while the session is active, using the security server, wherein the events occur between the host device and the guest device through the communications tunnel.

5. The method of claim 4, wherein the events comprise one or more of the establishment of the session, the authentication of the guest device, the forwarding of the data through the selected allowed host port from the allowed host application, or an ending of the session.

6. The method of claim 1, wherein the guest device is a local device, and wherein the session and the communications tunnel are established through a separate computing device at the remote location between the local device and the host device in response to receiving the connection request.

7. The method of claim 6 wherein the separate computing device is one of at least a guest device and a proxy device.

8. A method for transporting data between a remote device and a guest device remote from the remote device through a communications tunnel, wherein the communications tunnel is through a host device and a connection facilitation server in communication with the host device and the guest device over a network, the host device is in communication with the remote device, and the data transported between the remote device and the guest device is through at least one port of the remote device, the host device, the communications tunnel, and at least one port of the guest device, the method comprising:
   (A) receiving, at the connection facilitation server, a connection request from the guest device to establish the communications tunnel with the remote device;
   (B) receiving, at the connection facilitation server, an identification of the host device for indicating to the connection facilitation server that the host device is available for connection to the guest device, wherein the identification of the host device is a unique identifier associated with the host device;

(C) establishing a session and the communications tunnel between the guest device and the remote device via the connection facilitation server, in response to receiving the connection request and the identification of the host device;

(D) receiving logon credentials from the guest device at the host device through the communications tunnel;

(E) authenticating the guest device based on the logon credentials and the identification of the host device, using a security server in communication with the host device;

(F) determining an identification of the remote device, using the host device;

(G) when the guest device is authenticated, using the security server, determining a role of the guest device based on (i) the logon credentials (ii) the identification of the remote device and (iii) one or more of a date, a time, an identification of the guest device, an identification of the host device, a connection type between the guest device and the connection facilitation server, or an authentication type, wherein the role comprises a plurality of allowed remote ports that the guest device is authorized to access and a plurality of allowed remote applications associated with plurality of allowed remote ports, the plurality of allowed remote applications capable of executing on the remote device;

(H) transmitting a list of the plurality of allowed host ports and the plurality of allowed host applications from the security server to the host device;

(I) transmitting the list of the plurality of allowed host ports and the plurality of allowed host applications from the host device to the guest device through the communications tunnel;

(J) receiving a selection of one of the plurality of allowed remote ports and the plurality of allowed remote applications from the guest device at the host device through the communications tunnel; and (K) forwarding the data from the selected allowed remote application through the selected one of the plurality of allowed remote ports, the host device, the communications tunnel, and a selected one of a plurality of ports of the guest device, while the session is active, wherein the selected one of the plurality of ports of the guest device is dynamically selected by the guest device independently of the selected allowed remote application and the selected one of the plurality of allowed remote ports.

9. The method of claim 8, wherein:
the connection request comprises an identification of the guest device;
receiving the logon credentials comprises:
  determining an authentication type for the guest device, using the security server, based on predefined settings associated with the guest device on the security server;
  transmitting the authentication type from the host device to the guest device through the communications tunnel; and
  receiving the logon credentials corresponding to the authentication type from the guest device at the host device through the communications tunnel; and
authenticating the guest device comprises denoting that the guest device is authenticated, using the security server, when the logon credentials are valid.

10. The method of claim 8, wherein authenticating the guest device comprises:
determining an expected authentication type for the guest device based on predefined settings associated with the guest device on the security server, using the security server;
transmitting the expected authentication type for the guest device from the security server to the host device and the guest device;
receiving a first factor authentication at the security server from a first factor authentication authority, when the authentication type is valid;
receiving a second factor authentication at the security server from a second factor authentication authority, when the first factor authentication is successful; and
denoting that the guest device is authenticated, using the security server, when the first factor authentication and the second factor authentication are successful.

11. The method of claim 8, further comprising logging events and corresponding timestamps to a database while the session is active, using the security server, wherein the events occur between the remote device and the guest device through the communications tunnel.

12. The method of claim 11, wherein the events comprise one or more of the establishment of the session, the authentication of the guest device, the forwarding of the data through the selected allowed remote port from the allowed remote application, or an ending of the session.

13. The method of claim 8, wherein the remote device comprises one or more of a building control system, an industrial control system, a printer, a copier, or a device with networking capability.

14. A system for transporting data between a host device and a guest device remote from the host device through a communications tunnel, the communications tunnel through a connection facilitation server in communication with the host device and the guest device over a network, the system comprising:

(A) the connection facilitation server having a first processor configured to:
  receive a connection request from the guest device to establish the communications tunnel with the host device;
  receive an identification of the host device for indicating to the connection facilitation server that the host device is available for connection to the guest device, wherein the identification of the host device is a unique identifier associated with the host device;
  establish a session and the communications tunnel between the guest device and the host device, in response to receiving the connection request and the identification of the host device; and
  forward the data from a selected allowed host application through a selected one of a plurality of allowed host ports, the communications tunnel, and a selected one of a plurality of ports of the guest device, while the session is active, wherein the one of the plurality of ports of the guest device is dynamically selected by the guest device independently of the selected allowed host application and the selected one of the plurality of allowed host ports;

(B) the host device having a second processor configured to:
  transmit a list of the plurality of allowed host ports and the plurality allowed host applications to the guest device through the communications tunnel;

receive logon credentials from the guest device through the communications tunnel;
execute at least one of the plurality of allowed host applications associated with the plurality of allowed host ports that the guest device is authorized to access; and
receive a selection of one of the plurality of allowed host ports and the plurality of allowed host applications from the guest device through the communications tunnel; and
(C) a security server in communication with the host device, the security server having a third processor configured to:
authenticate the guest device based on the logon credentials and the identification of the host device;
when the guest device is authenticated, determine a role of the guest device based on (i) the logon credentials and (ii) one or more of a date, a time, an identification of the guest device, an identification of the host device, a connection type between the guest device and the connection facilitation server, or an authentication type, wherein the role comprises the plurality of allowed host ports and the plurality of allowed host applications; and
transmit the list of the plurality of allowed host ports and the plurality of allowed host applications to the host device.

15. The system of claim 14, wherein:
the connection request comprises an identification of the guest device;
the third processor of the security server is configured to receive the logon credentials by determining an authentication type for the guest device, based on predefined settings associated with the guest device on the security server;
the second processor of the host device is configured to receive the logon credentials by:
transmitting the authentication type to the guest device through the communications tunnel; and
receiving the logon credentials corresponding to the authentication type from the guest device through the communications tunnel; and
the third processor of the security server is configured to authenticate the guest device by denoting that the guest device is authenticated when the logon credentials are valid.

16. The system of claim 14, wherein the third processor of the security server is configured to authenticate the guest device by:
determining an expected authentication type for the guest device based on predefined settings associated with the guest device on the security server, using the security server;
transmitting the expected authentication type for the guest device from the security server to the host device and the guest device;
receiving a first factor authentication from a first factor authentication authority, when the authentication type is valid;
receiving a second factor authentication from a second factor authentication authority, when the first factor authentication is successful; and
denoting that the guest device is authenticated, when the first factor authentication and the second factor authentication are successful.

17. A system for transporting data between a remote device and a guest device remote from the remote device through a communications tunnel, the communications tunnel through a host device and a connection facilitation server in communication with the host device and the guest device over a network, the system comprising:
(A) the connection facilitation server having a first processor configured to:
receive a connection request from the guest device to establish the communications tunnel with the remote device;
receive an identification of the host device for indicating to the connection facilitation server that the host device is available for connection to the guest device, wherein the identification of the host device is a unique identifier associated with the host device;
establish a session and the communications tunnel between the guest device and the remote device, in response to receiving the connection request and the identification of the host device; and
forward the data from a selected allowed remote application through a selected allowed remote port, the host device, the communications tunnel, and a port of the guest device, while the session is active, wherein the port of the guest device is dynamically selected by the guest device independently of the selected allowed remote application and the selected allowed remote port;
(B) the host device having a second processor configured to:
receive logon credentials from the guest device through the communications tunnel;
determine an identification of the remote device;
receive a selection of (i) one of a plurality of allowed remote ports that the guest device is authorized to access and (ii) one of a plurality of allowed remote applications associated with the plurality of allowed remote ports, from the guest device through the communications tunnel; and
transmit a list of the plurality of allowed remote ports and the plurality of allowed remote applications to the guest device through the communications tunnel;
(C) the remote device having a third processor configured to execute the plurality of allowed remote applications; and
(D) a security server in communication with the host device, the security server having a fourth processor configured to:
authenticate the guest device based on the logon credentials and the identification of the host device; and
when the guest device is authenticated, determine a role of the guest device based on (i) the logon credentials and (ii) the identification of the remote device, and (iii) one or more of a date, a time, an identification of the guest device, an identification of the host device, a connection type between the guest device and the connection facilitation server, or an authentication type, wherein the role comprises the plurality of allowed remote ports and the plurality of allowed remote applications; and
transmit the list of the plurality of allowed remote ports and the plurality of allowed remote applications to the host device.

18. The system of claim 17, wherein:
the connection request comprises an identification of the guest device;
the fourth processor of the security server is configured to receive the logon credentials by determining an authentication type for the guest device, based on predefined settings associated with the guest device on the security server;
the second processor of the host device is configured to receive the logon credentials by:
transmitting the authentication type to the guest device through the communications tunnel; and
receiving the logon credentials corresponding to the authentication type from the guest device through the communications tunnel; and
the fourth processor of the security server is configured to authenticate the guest device by denoting that the guest device is authenticated when the logon credentials are valid.

19. The system of claim 17, wherein the fourth processor of the security server is configured to authenticate the guest device by:
determining an expected authentication type for the guest device based on predefined settings associated with the guest device on the security server, using the security server;
transmitting the expected authentication type for the guest device from the security server to the host device and the guest device;
receiving a first factor authentication from a first factor authentication authority, when the authentication type is valid;
receiving a second factor authentication from a second factor authentication authority, when the first factor authentication is successful; and
denoting that the guest device is authenticated, when the first factor authentication and the second factor authentication are successful.

20. The system of claim 17, wherein the remote device comprises one or more of a building control system, an industrial control system, a printer, a copier, or a device with networking capability.

21. A method for transporting data directly between a host device and a guest device remote from the host device through a communications tunnel via a network, wherein the data transported between the host device and the guest device is through at least one port of the host device, the communications tunnel, and at least one port of the guest device, the method comprising:
(A) receiving, at the connection facilitation server, a connection request from the guest device to establish the communications tunnel with the host device;
(B) receiving, at the connection facilitation server, an identification of the host device for indicating to the connection facilitation server that the host device is available for connection to the guest device, wherein the identification of the host device is a unique identifier associated with the host device;
(C) establishing a session and the communications tunnel directly between the guest device and the host device, in response to receiving the connection request and the identification of the host device;
(D) receiving logon credentials from the guest device at the host device through the communications tunnel;
(E) authenticating the guest device based on the logon credentials and the identification of the host device, using a security server in communication with the host device;
(F) when the guest device is authenticated, using the security server, determining a role of the guest device based on (i) the logon credentials and (ii) one or more of a date, a time, an identification of the guest device, an identification of the host device, a connection type between the guest device and the connection facilitation server, or an authentication type, wherein the role comprises a plurality of allowed host ports that the guest device is authorized to access and a plurality of allowed host applications associated with the plurality of allowed host ports, the plurality of allowed host applications capable of executing on the host device;
(G) transmitting a list of the plurality of allowed host ports and the plurality of allowed host applications from the security server to the host device;
(H) transmitting the list of the plurality of allowed host ports and the plurality allowed host applications from the host device to the guest device through the communications tunnel;
(I) receive a selection of one of the plurality of allowed host ports and one of the plurality of allowed host applications from the guest device through the communications tunnel; and
(J) forwarding the data from the selected allowed host application through the selected allowed host port, the communications tunnel, and a port of the guest device, while the session is active, wherein the port of the guest device is dynamically selected by the guest device independently of the selected allowed host application and the selected allowed host port.

22. A method for transporting data directly between a remote device and a guest device remote from the remote device through a communications tunnel, wherein the communications tunnel is through a host device and a connection facilitation server in communication with the host device and the guest device over a network, the host device is in communication with the remote device, and the data transported between the remote device and the guest device is through at least one port of the remote device, the host device, the communications tunnel, and at least one port of the guest device, the method comprising:
(A) receiving, at the connection facilitation server, a connection request from the guest device to establish the communications tunnel with the remote device;
(B) receiving, at the connection facilitation server, an identification of the host device for indicating to the connection facilitation server that the host device is available for connection to the guest device, wherein the identification of the host device is a unique identifier associated with the host device;
(C) establishing a session and the communications tunnel directly between the guest device and the remote device, in response to receiving the connection request and the identification of the host device;
(D) receiving logon credentials from the guest device at the host device through the communications tunnel;
(E) authenticating the guest device based on the logon credentials and the identification of the host device, using a security server in communication with the host device;
(F) determining an identification of the remote device, using the host device;
(G) when the guest device is authenticated, using the security server, determining a role of the guest device based on (i) the logon credentials and (ii) the identification of the remote device, and (iii) one or more of a date, a time, an identification of the guest device, an identification of the host device, a connection type between the guest device and the connection facilitation server, or an authentication type, wherein the role comprises a plurality of allowed remote ports that the guest device is authorized to access and plurality of allowed remote applications associated with the plurality of allowed remote ports, the plurality of allowed remote applications capable of executing on the remote device;

(H) transmitting a list of the plurality of allowed host ports and the plurality of allowed host applications from the security server to the host device;

(I) transmitting the list of the plurality of allowed host ports and the plurality of allowed host applications from the host device to the guest device through the communications tunnel;

(J) receive a selection of one of the plurality of allowed remote ports and the plurality of allowed remote applications from the guest device through the communications tunnel; and (K) forwarding the data from the selected allowed remote application through the selected one of the plurality of allowed remote ports, the host device, the communications tunnel, and a selected one of a plurality of ports of the guest device, while the session is active, wherein the one of the plurality of ports of the guest device is dynamically selected by the guest device independently of the selected allowed remote application and the selected one of the plurality of allowed remote ports.

23. The method of claim 1, further comprising:
terminating the session and the communications tunnel upon ending of the session; and
repeating steps (A)-(J) using a second selected one of the plurality of allowed host ports and a second one of the plurality of ports of the guest device, wherein the second one of the plurality of ports of the guest device is dynamically selected by the guest device.

24. The method of claim 8, further comprising:
terminating the session and the communications tunnel upon ending of the session; and
repeating steps (A)-(K) using a second selected one of the plurality of allowed host ports and a second one of the plurality of ports of the guest device, wherein the second one of the plurality of ports of the guest device is dynamically selected by the guest device.

25. The method of claim 21, further comprising:
terminating the session and the communications tunnel upon ending of the session; and
repeating steps (A)-(J) using a second selected one of the plurality of allowed host ports and a second one of the plurality of ports of the guest device, wherein the second one of the plurality of ports of the guest device is dynamically selected by the guest device.

26. The method of claim 22, further comprising:
terminating the session and the communications tunnel upon ending of the session; and
repeating steps (A)-(K) using a second selected one of the plurality of allowed host ports and a second one of the plurality of ports of the guest device, wherein the second one of the plurality of ports of the guest device is dynamically selected by the guest device.

* * * * *